Aug. 23, 1960
A. ETIENNE
2,949,745
PROCESS OF SEPARATION OF GASEOUS MIXTURES
IN A HEAT EXCHANGE APPARATUS
Filed Feb. 21, 1956
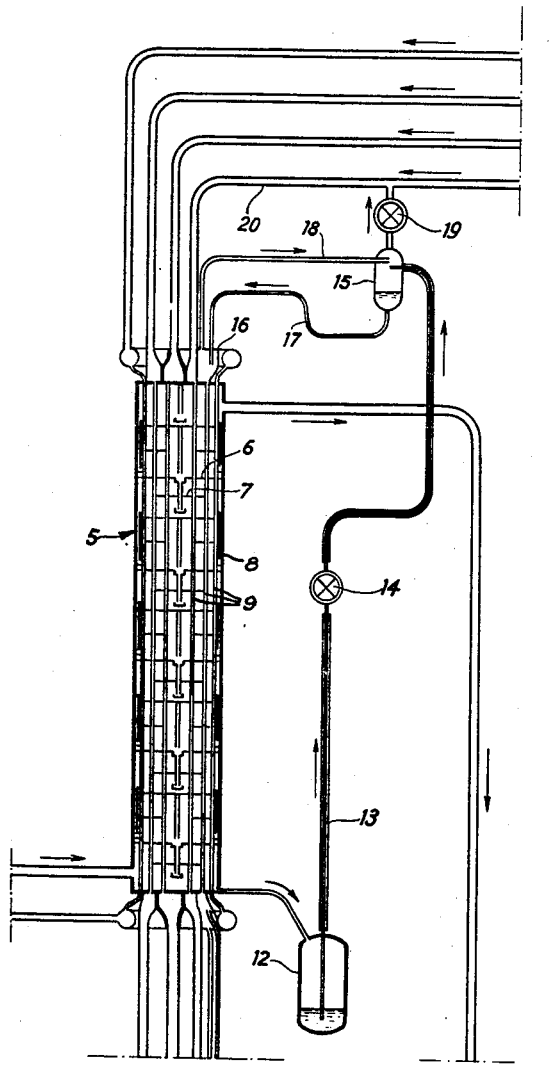
INVENTOR
ALFRED ETIENNE
BY Young, Emery & Thompson
ATTYS.

United States Patent Office 2,949,745
Patented Aug. 23, 1960

2,949,745

PROCESS OF SEPARATION OF GASEOUS MIXTURES IN A HEAT EXCHANGE APPARATUS

Alfred Etienne, Paris, France, assignor to L'Air Liquide, Societe Anonyme pour l'Etude et l'Exploitation des Procedes Georges Claude, Paris, France Filed Feb. 21, 1956, Ser. No. 566,975

Claims priority, application France Mar. 9, 1955

2 Claims. (Cl. 62—32)

The present invention has for subject-matter a process of separation of gaseous mixtures in a heat exchange apparatus, in which a gaseous mixture is passing on one side of the heat exchange surface and is subjected to a partial liquefaction, while a liquid mixture is flowing on the other side of the heat exchange surface and is subjected to a partial vaporization.

In the known processes, the vapours evolved during the partial vaporization are carried along with the liquid and are not separated from said liquid but outside of the heat exchange apparatus.

The process according to the invention is characterized in that the liquid flows down by gravity on the heat exchange surface as a relatively thin layer, and in that the evolved vapours are rectified by rising in contact with the liquid.

The rising vapour is continually enriched in lower boiling components from the liquid, and the downflowing liquid is continually enriched in high boiling components from the vapour. The final products are thus purer.

According to an embodiment of the invention, the liquid mixture subjected to the counterflow vaporization is constituted by the liquefied part of the gaseous mixture which passes on one side of the heat exchange surface; this liquefied part is expanded to a lower pressure and introduced on the other side of the heat exchange surface, where it is subjected to the partial vaporization according to the invention.

The separation already obtained by the partial liquefaction of the gaseous mixture is thus completed by the counterflow vaporization according to the invention.

According to another embodiment of the invention, the partial liquefaction of the gaseous mixture which passes on one side of the heat exchange surface is effected under reflux, along a known method. There are thus effected on either side of the heat exchange surface two symmetrical processes of rectification; on one side, a rectification by reflux condensation, and on the other side a rectification by counterflow-vaporization.

As an example, there is described underneath and represented in the annexed drawing a preferred embodiment of the invention.

The figure is a schematic cross-sectional axial view of a heat exchanger according to the invention, used in a coke oven gas separation plant for the reflux condensation of ethylene.

The exchanger-condenser 5 includes, in a cylindrical casing 8 resistant to the pressure of the gas to be treated, a bundle of vertical tubes 9 passing across horizontal baffles 7 and rectifying trays 6 of the type described in my patent application No. 566,681 filed February 20, 1956, now Patent No. 2,900,799 granted August 25, 1959.

The liquid formed under pressure in that condenser is collected in a pot 12 and raised by the tube 13 and the expanding cock 14 to the top of the exchanger, in a separator 15. From that separator, the liquid flows in a room 16 through a tube 17 and is distributed into part of the tubes of the condenser 5 to be partly vaporized. The distribution of the liquid must be kept as uniform as possible, either by spraying it, or by providing each tube with a distributing device; besides, the number and the cross-section of the tubes must be great enough so that the liquid will flow on the inner wall of the tubes and that the evolved gas will rise about their axis. The gas is collected in the room 16, whence it goes to the separator 15 through a tube 18. From the separator 15, the evolved gas is sent through the expansion cock 19 into a tube 20, where it mixes with the methane obtained in the following condensation stage.

This device ensures a real rectification of the ethylenic liquid. For, while flowing downwards inside the tubes, the liquid is subjected to a temperature variation as it goes further down towards the warmer parts of the exchanger; the lower boiling components, such as methane, are vaporized; as they rise, they meet colder and colder liquid and release their higher boiling components; the liquid is thus enriched in higher boiling components and the gas in lower boiling components. There comes out below an ethylene-rich liquid and above a gas including mainly methane which one may unite to the methane coming from the next condensation stage.

There are thus in the same apparatus two symmetrical operations. First, around the tubes, a reflux condensation of the ethylenic liquid; secondly, inside part of the tubes, a vaporization of the same liquid with a reflux upwards of the evolved vapours.

However, it may be convenient in some applications to effect that vaporization in the tubes of another exchanger than that one which provided the liquid to be rectified. One may too, when two reflux condensers are used in succession, put them one upon the other and extend in the lower condenser the tubes used to concentrate the liquid of the upper condenser, so as to improve the efficiency of the rectification.

What I claim is:

1. A process of separation of coke oven gaseous mixtures in a heat exchange apparatus, comprising passing a gaseous mixture on the outside of the heat exchange surface of the apparatus and partly liquefying it, passing a liquid mixture containing ethylene on the inside of the heat exchange surface as a relatively thin layer flowing down by gravity on said heat exchange surface and partly vaporizing the methane content of the mixture, rectifying the evolved vapors by letting them rise in countercurrent contact with the liquid, separately collecting said rectified vapors and said liquid, and returning the rectified vapors in heat exchange with the said gaseous mixture flowing on the outside of the heat exchange surface of the apparatus.

2. A process of separation of hydrocarbon gaseous mixtures containing substantial amounts of methane and $C_2$ hydrocarbons in a heat exchange apparatus, comprising passing a gaseous mixture on the outside of the heat exchange surface of the apparatus and partly liquefying it, passing a liquid mixture containing $C_2$ hydrocarbons and some methane on the inside of the heat exchange surface as a relatively thin layer flowing down by gravity on said heat exchange surface and partly vaporizing the methane content of the mixture, rectifying the evolved vapors by letting them rise in countercurrent contact with the liquid, separately collecting said rectified vapors and said liquid, and returning the collected rectified vapors in heat exchange with the said gaseous mixture flowing on the outside of the heat exchange surface of the apparatus.

(References on following page)

References Cited in the file of this patent

UNITED STATES PATENTS

| Number | Name | Date |
|---|---|---|
| 1,212,455 | Claude | Jan. 16, 1917 |
| 1,323,014 | Claude | Nov. 25, 1919 |
| 1,579,348 | Claude | Apr. 6, 1926 |
| 1,913,628 | Falkenberg | June 13, 1933 |
| 1,913,805 | Hausen | June 13, 1933 |
| 1,963,841 | Frankl | June 19, 1934 |
| 2,084,334 | Frankl | June 22, 1937 |
| 2,503,265 | Haynes | Apr. 11, 1950 |
| 2,668,424 | Mueller | Feb. 9, 1954 |

FOREIGN PATENTS

| Number | Country | Date |
|---|---|---|
| 360,487 | Great Britain | Nov. 9, 1931 |
| 591,095 | France | Apr. 1, 1925 |